(12) United States Patent
Hou et al.

(10) Patent No.: US 11,217,866 B2
(45) Date of Patent: Jan. 4, 2022

(54) BATTERY MODULE FOR IMPROVING SAFETY

(71) Applicant: STL Technology Co., Ltd., Kaohsiung (TW)

(72) Inventors: Chin-Din Hou, Kaohsiung (TW); Tao-Cheng Wu, Kaohsiung (TW)

(73) Assignee: STL TECHNOLOGY CO., LTD., Kaohsiung (TW)

( * ) Notice: Subject to any disclaimer, the term of this patent is extended or adjusted under 35 U.S.C. 154(b) by 0 days.

(21) Appl. No.: 16/817,584

(22) Filed: Mar. 12, 2020

(65) Prior Publication Data

US 2021/0074988 A1     Mar. 11, 2021

(30) Foreign Application Priority Data

Sep. 10, 2019   (TW) .................................. 108132525

(51) Int. Cl.
*H01M 50/581* (2021.01)
*H01M 50/20* (2021.01)
*H01M 50/213* (2021.01)

(52) U.S. Cl.
CPC ......... *H01M 50/581* (2021.01); *H01M 50/20* (2021.01); *H01M 50/213* (2021.01); *H01M 2200/103* (2013.01)

(58) Field of Classification Search
CPC .... H01M 50/20; H01M 50/213; H01M 50/81; H01M 50/183
See application file for complete search history.

(56) References Cited

U.S. PATENT DOCUMENTS

| | | | |
|---|---|---|---|
| 2013/0122329 A1* | 5/2013 | Park ................... | H01M 50/502 429/7 |
| 2013/0207459 A1* | 8/2013 | Schroder ................ | B60L 50/64 307/10.1 |
| 2015/0244045 A1* | 8/2015 | Sun ..................... | H01M 10/613 429/71 |

* cited by examiner

*Primary Examiner* — Kenneth J Douyette
(74) *Attorney, Agent, or Firm* — Chun-Ming Shih; HDLS IPR Services

(57) ABSTRACT

The invention provides a battery module for improving safety, which comprises at least one fixing frame, a plurality of battery cells, a plurality of conductive sheets and a plurality of protection units. The battery cells are arranged on the fixing frame. Each conductive sheet is connected with two battery cells in series, each of the protection units is respectively connected with two conductive sheets, and the battery cells connected with the conductive sheets are connected in parallel via the protection unit. When the temperature of the protection unit is greater than a preset temperature, the protection unit will be blown, thereby preventing the battery cells from charging the defective battery cell, resulting in the defective battery cell to melt or explode.

8 Claims, 6 Drawing Sheets

BATTERY MODULE FOR IMPROVING SAFETY

This non-provisional application claims priority claim under 35 U.S.C. § 119(a) on Taiwan Patent Application No. 108132525 filed Sep. 10, 2019, the entire contents of which are incorporated herein by reference.

FIELD OF THE INVENTION

The invention provides a battery module for improving safety, which can prevent defective battery cells from being abnormally charged by parallel battery cells, causing the defective battery cells to melt or explode, and is beneficial to improve safety of battery module.

BACKGROUND

Rechargeable batteries, storage batteries, or secondary cells have been widely used in mobile phone, laptop computer, digital camera and electric vehicles. In general, multiple battery cells may be connected in serial and/or in parallel to be a battery module for outputting driving voltage.

Specifically, a plurality of battery cells may be arranged on fixing frames, and each battery cell is connected in series and parallel through conductive sheets to form a battery module.

In actual application, if one of the battery cells in the battery module fails and forms a short circuit, it may cause the other normal battery cells to charge the defective battery cell with a large current, and then temperature of the defective battery cell will rise. When the temperature of the defective battery cell is higher than the temperature that the isolation layer inside the defective battery cell can withstand, the isolation layer will be broken. Therefore, the short circuit is formed between the positive and negative electrode materials of the defective battery cell, and then the defective battery cell may melt or explode.

SUMMARY

An object of the invention is to provide a battery module for improving safety, including a plurality of battery cells, a plurality of conductive sheets, and a plurality of protection units. The conductive sheet is connected with the battery cells in series, and the protection unit is connected with the battery cells in parallel. When the temperature of the protection unit is too high and/or too much current flows through the protection unit, the protection unit may melt to form an open circuit between the defective battery cell and the normal battery cells connected in parallel to prevent the defective battery cell from melting or explosion.

An object of the invention is to provide a battery module for improving safety, including a plurality of battery cells, at least one fixing frame, a plurality of conductive sheets, and a plurality of protection units. The battery cells are arranged on the fixing frame in a matrix. Adjacent battery cells in a first direction are arranged in opposite directions, while battery cells in a second direction are arranged in the same direction. Two adjacent battery cells in the first direction are connected in series via the conductive sheet, and two adjacent conductive sheets in the second direction are connected each other via the protection unit, so that the battery cells that are connected with two adjacent conductive sheets in the second direction are connected in parallel via the protection unit.

Thus, the invention provides a battery module for improving safety, comprising: at least one fixing frame; a plurality of battery cells arranged on the fixing frame; a plurality of conductive sheets respectively connected with two of the battery cells in series; and one or more protection units connected with two of the conductive sheets, and the battery cells connected to the conductive sheets being connected in parallel via the protection unit, wherein when a temperature of the protection unit is greater than a preset temperature, or a current flowing the protection unit is greater than a preset current, the protection unit will be disconnected or blown.

BRIEF DESCRIPTION OF THE DRAWINGS

The structure as well as preferred modes of use, further objects, and advantages of this invention will be best understood by referring to the following detailed description of some illustrative embodiments in conjunction with the accompanying drawings, in which.

DETAILED DESCRIPTION OF THE PREFERRED EMBODIMENTS

Figure 1:
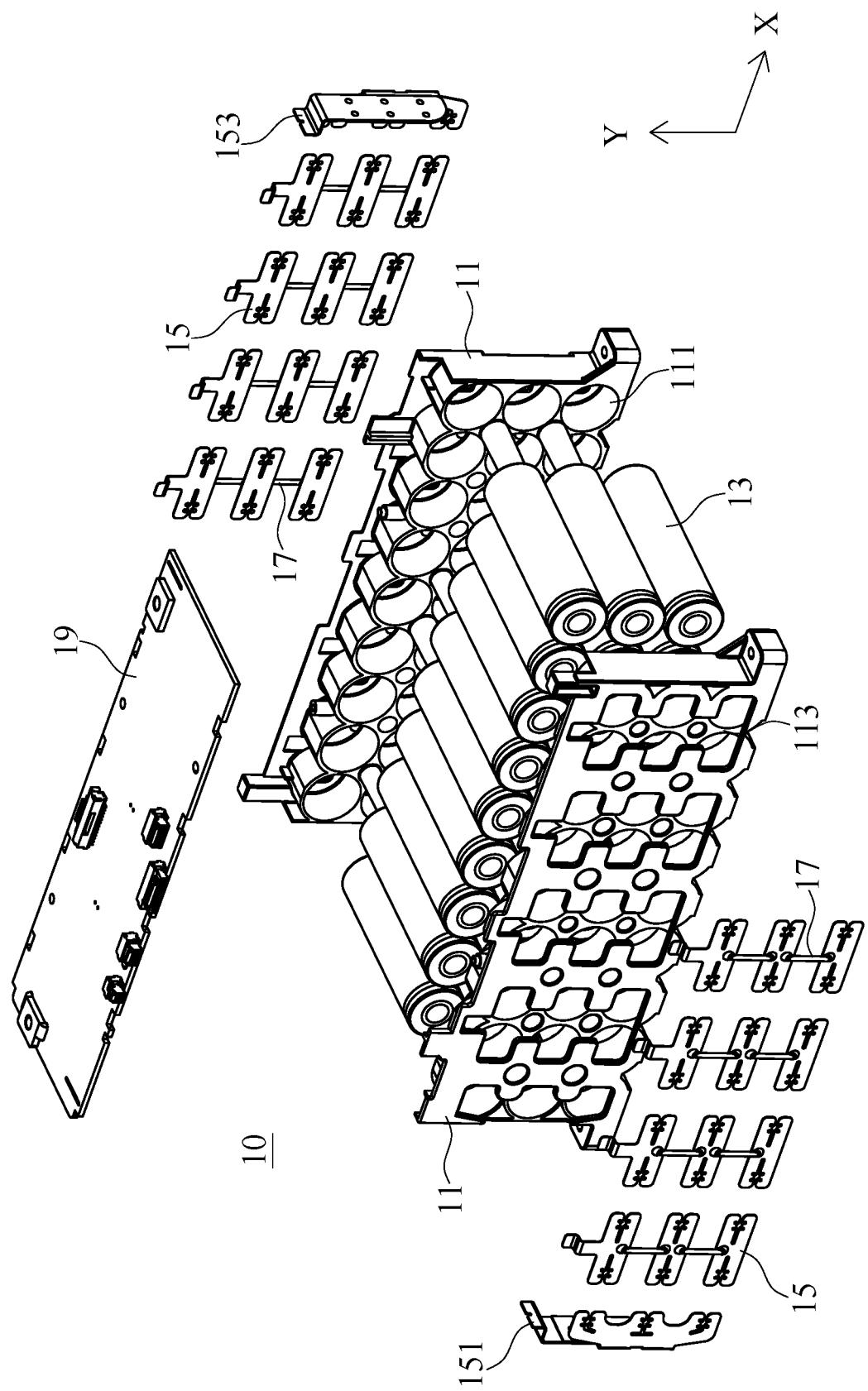
FIG. 1 is an exploded view of a battery module for improving safety according to an embodiment of the invention.
Figure 2:
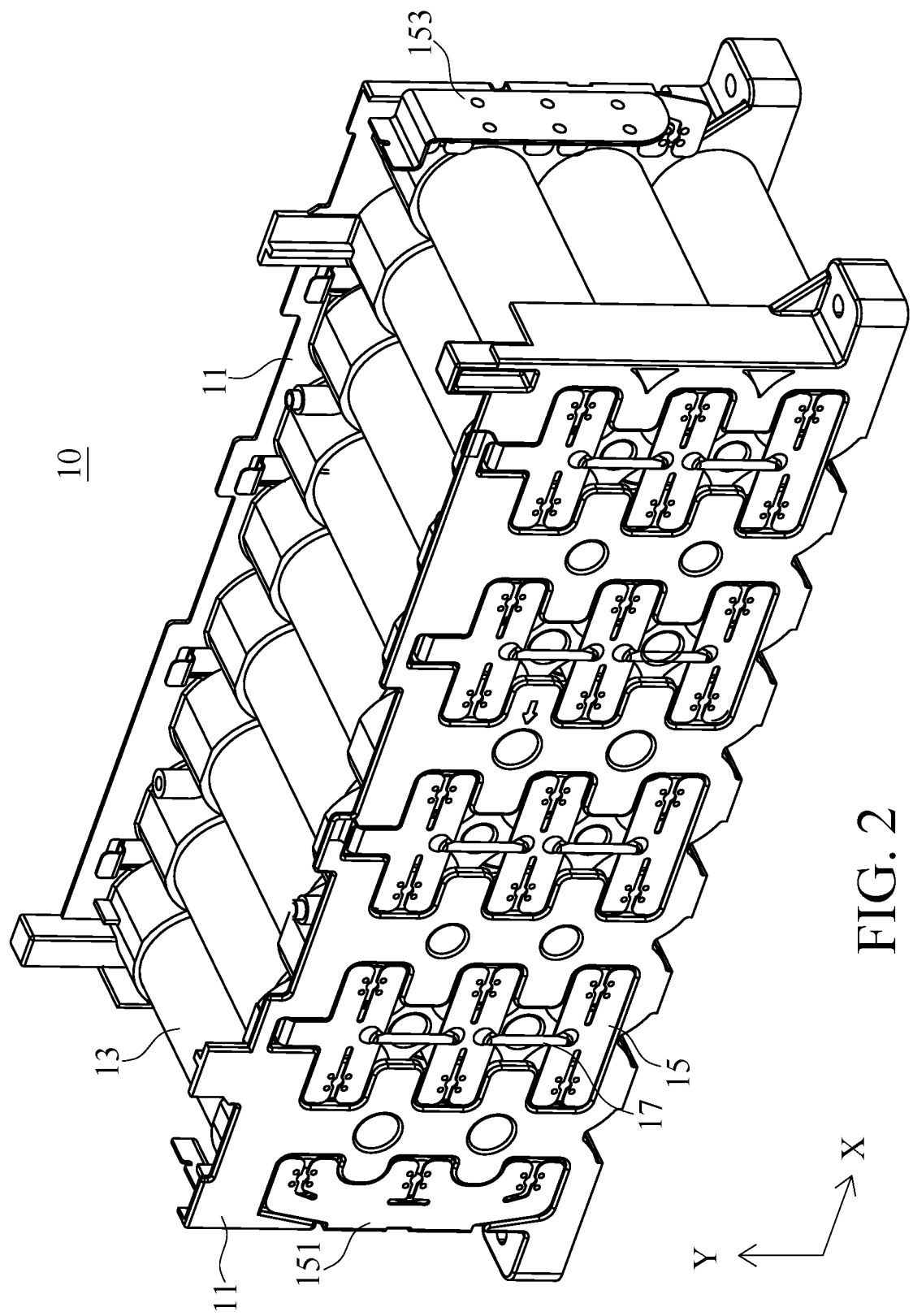
FIG. 2 is a schematic diagram of a battery module for improving safety according to an embodiment of the invention.

Refer to FIG. 1 and FIG. 2, which are respectively an exploded view and a schematic diagram of a battery module for improving safety according to an embodiment of the invention. The battery module 10 includes at least one fixing frame 11, a plurality of battery cells 13, a plurality of conductive sheets 15, and a plurality of protection units 17. The battery cells 13 are arranged on the fixing frame 11, the conductive sheet 15 is connected with the battery cells 13 in series, and the protection unit 17 is connected with the battery cells 13 in parallel.

In one embodiment of the invention, a plurality of battery cells 11 may be arranged as a matrix, wherein the battery cells 11 are arranged along a first direction X and a second direction Y, and the first direction X is approximately perpendicular to the second direction Y. The adjacent battery cells 11 in the first direction X are arranged in opposite directions, and thus the positive and negative electrodes of the adjacent battery cells 11 in the first direction X are in opposite directions. Further, the battery cells in the second direction Y are arranged in the same direction, and thus the positive and negative electrodes of the adjacent battery cells 11 in the second direction Y are the same. Of course, the arrangement of the above-mentioned battery cells 11 is only an embodiment of the invention. In actual application, the battery cells 11 may not be arranged as a matrix.

The fixing frame 11 is used for fixing the battery cells 13, wherein the fixing frame 11 may include a plurality of battery cell grooves 111 for receiving and fixing the battery cells 13. For example, the battery cell grooves 111 may be arranged on one surface of the fixing frame 11 as a matrix, and each battery cell 13 is inserted into each battery cell groove 111 respectively, so that the battery cells 13 are arranged on the fixing frame 11 as a matrix.

In an embodiment of the invention, the battery module 10 may comprise two fixing frames 11. Both fixing frames 11 have the same or similar structure, and are respectively disposed at both ends of the battery cells 13, thereby fixing the battery cells 13 between the two fixing frames 11. For example, one end of the battery cell 13 is disposed in one of the fixing frames 11, and the other end of the battery cell 13 is disposed in the other fixing frame 11.

Figure 3:
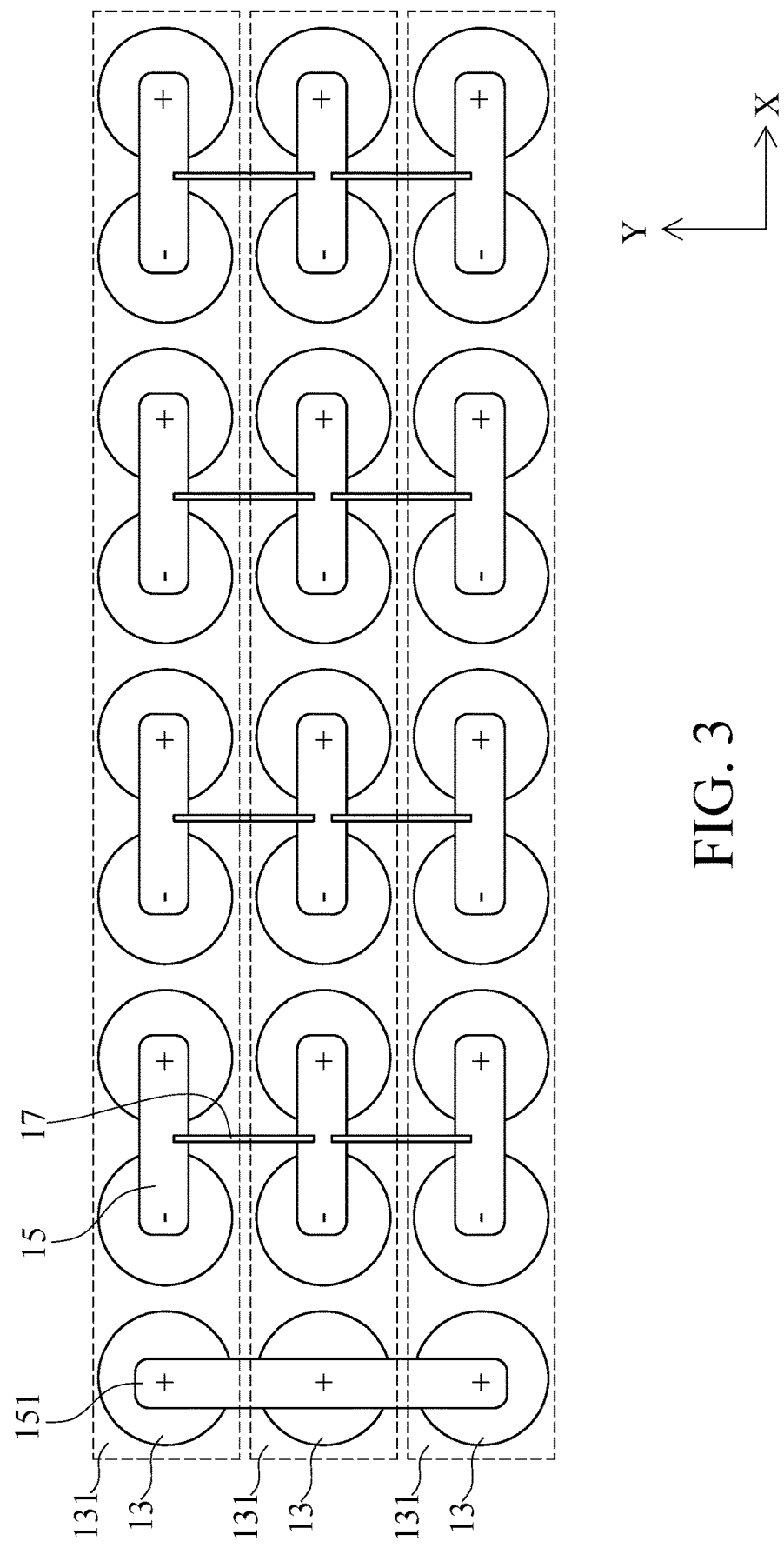
FIGS. 3 and 4 are respectively a side view on two opposite surfaces of a battery module for improving safety according to an embodiment of the invention.
Figure 4:
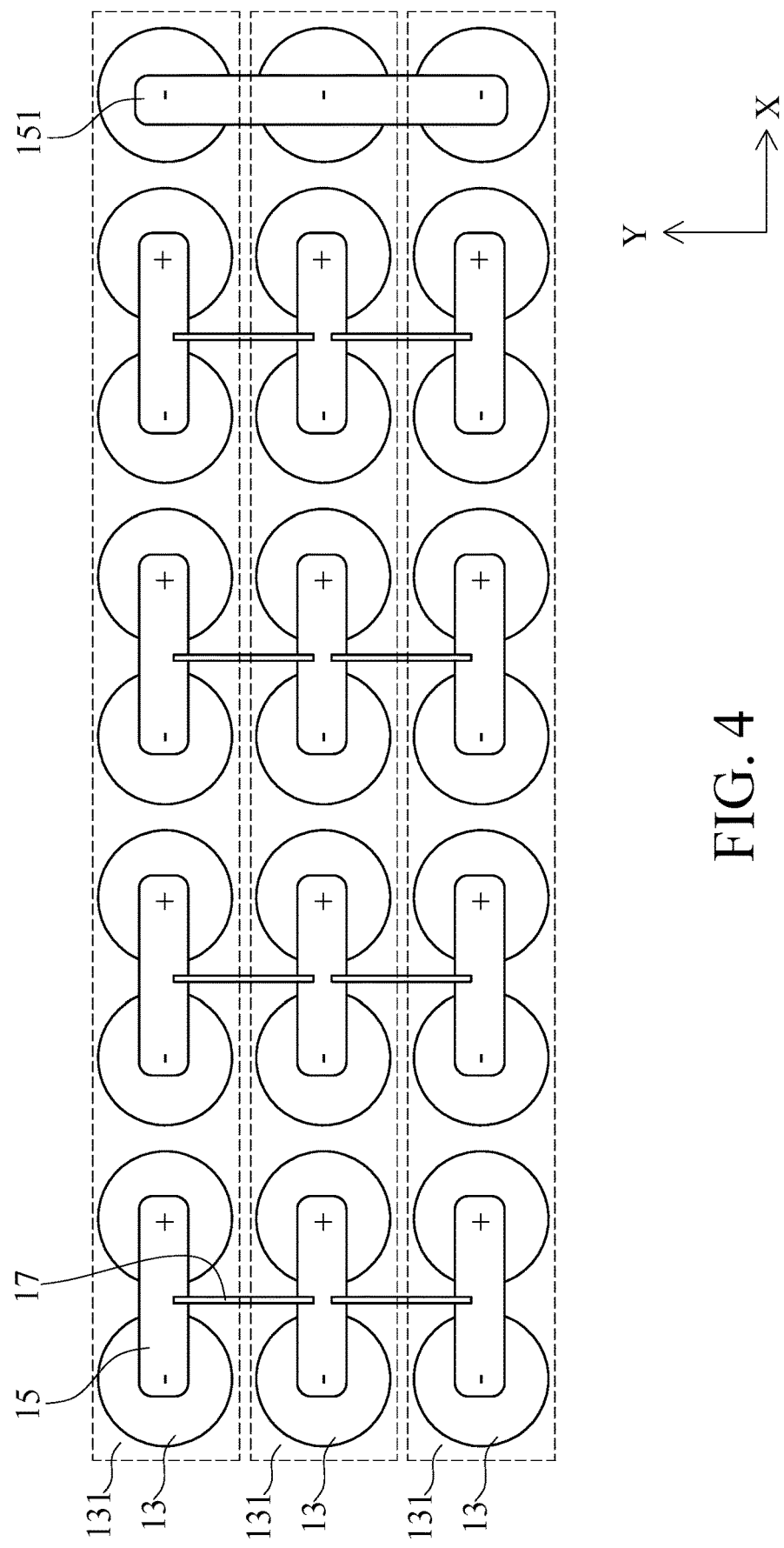

Each conductive sheet 15 is connected with two battery cells 13 in series. For example, the conductive sheet 15 may be connected to a positive electrode and a negative electrode of two adjacent battery cells 13 by spot welding or laser welding. When the battery cells 13 are arranged as a matrix, the conductive sheet 15 is connected two adjacent battery cells 13 arranged along the first direction X, wherein the positive and negative electrodes of the two adjacent battery cells 13 in the first direction X are in opposite directions, so that a plurality of battery cells 13 in the first direction X are connected in series via a plurality of conductive sheets 15 and form a series battery cell 131, as shown in FIG. 3 and FIG. 4. The conductive sheet 15 may be made of a metal material, such as a nickel sheet and a copper sheet.

In one embodiment of the invention, the battery cell grooves 111 may be arranged on one surface of the fixing frame 11, and a plurality of conductive sheet grooves 113 may be disposed on the other surface of the fixing frame 11. Each of the battery cell grooves 111 is connected to the conductive sheet groove 113. The conductive sheet 15 is disposed in the conductive sheet groove 113 and electrically connected to the battery cell 13 in the battery cell groove 111.

Each protection unit 17 is connected with two conductive sheets 15 respectively, so that the two conductive sheets 15 are connected in parallel, and the battery cells 13 connected to the conductive sheets 15 are connected in parallel via the protection unit 17. When the temperature of the protection unit 17 is over a preset temperature, or the current flowing through the protection unit 17 is over a preset current, the protection unit 17 will be blown.

When one of the battery cells 11 of the battery module 100 fails and shorts, other normal battery cell 11 may charge the defective battery cell 11 connected in parallel via the protection unit 19, and thus the current flowing through the protection unit 19 will increase, causing rise in temperature of protection unit 19. When the current passing through the protection unit 19 is greater than the preset current and/or the temperature of the protection unit 19 is greater than the preset temperature, the protection unit 19 will be blown out and form an open circuit between the normal battery cell 11 and the defective battery cell 11 connected in parallel so that the normal battery cell 11 will not charge the defective battery cell 11 connected in parallel.

The battery module 100 of the invention is able to prevent the normal battery cell 11 from continuously charging the defective battery cell 11 with a large current and rise in temperature of the defective battery cell 11. Thus, the occurrence of melting or explosion of the battery cell 11 can be effectively reduced, so as to improve the use safety of the battery module 100.

Specifically, the protection unit 19 of the invention may include, but is not limited to, a thermal fuse, a current fuse, a solder wire, a single-core copper wire, a resettable fuse (PTC), a resistor, etc. For example, the melting point of the solder wire is relatively low, and the solder wire may be blown to disconnect the defective battery cell and the normal battery cell connected in parallel, when the temperature of the solder wire rises. The solder wire may be connected with two conductive sheets 13 by common electric soldering iron or a welding gun to reduce the installation cost. In addition, the characteristics of single-core copper wires and resistors are similar to solder wires and can be set in a similar manner, which also has the advantages of low installation cost and easy installation.

In actual application, the preset temperature and/or the preset current can be changed through the material, length, width, and/or cross-sectional area of the protection unit 19. Taking the preset temperature as an example, a tin wire containing lead may melt at about 190° C., a lead-free tin wire may melt at about 220° C., and the temperature of defective battery cell 11 may be larger than 600° C. Thus, the wire (protection unit 19) will be blown before the battery cell 11 overheats, melts or explodes to form open circuit between the failed battery cell 11 and the normal battery cell 11 connected in parallel. Taking the preset current as an example, the current flowing the shorting or defective battery cell 11 may be about 100-200 A, and the tin wire may fuse due to high temperature, as the flowing current is greater than 40-50 A. Thus, the tin wire (protection unit 19) will be blown before the battery cell 11 overheats, melts or explodes to form an open circuit between the defective battery cell 11 and normal battery cell 11 connected in parallel. Further, the current flowing through the defective battery cell 11 may be related to the characteristics of battery cell 11 and the number of battery cells 11 connected in parallel.

In addition, if 1 ohm resistor with a size of 0603 is selected as the protection unit 19, it can withstand about 1/10 W of energy. When the instantaneous current is 100 A, the energy generated will be far higher than the range that the resistor can withstand, and the resistance will be fused. It can also disconnect the connection between the defective battery cell 11 and the normal battery cell 11 connected in parallel.

The battery module 10 further includes at least one first conductive sheet 151 and at least one second conductive sheet 153 that are contacted with part of battery cells 13 in parallel. The first conductive sheet 151 and the second conductive sheet 153 are a positive terminal and/or a negative terminal of the battery module battery 10, as shown in FIG. 1 to FIG. 4. For example, the battery cell 13 may be a rechargeable battery, and output current or be charged via the first conductive sheet 151 and the second conductive sheet 153. In general, the first conductive sheet 151 and the second conductive sheet 153 may be connected to one or more battery cells 13 on the side of the battery module 10. For example, the first conductive sheet 151 and the second conductive sheet 153 are disposed along the second direction Y, and connected to a plurality of battery cells 13 on the side in parallel.

Figure 5:
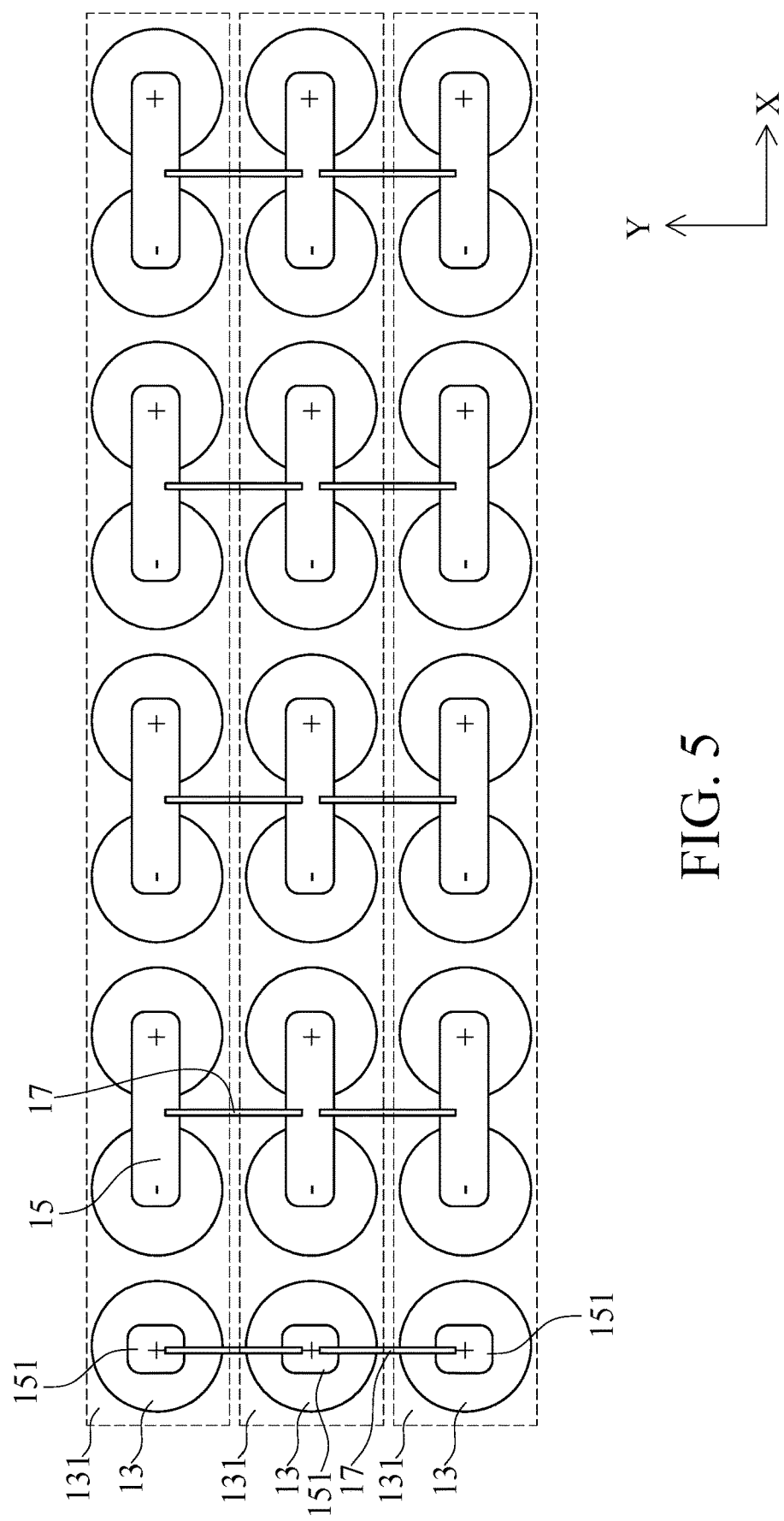
FIGS. 5 and 6 are respectively a side view on two opposite surfaces of a battery module for improving safety according to another embodiment of the invention.
Figure 6:
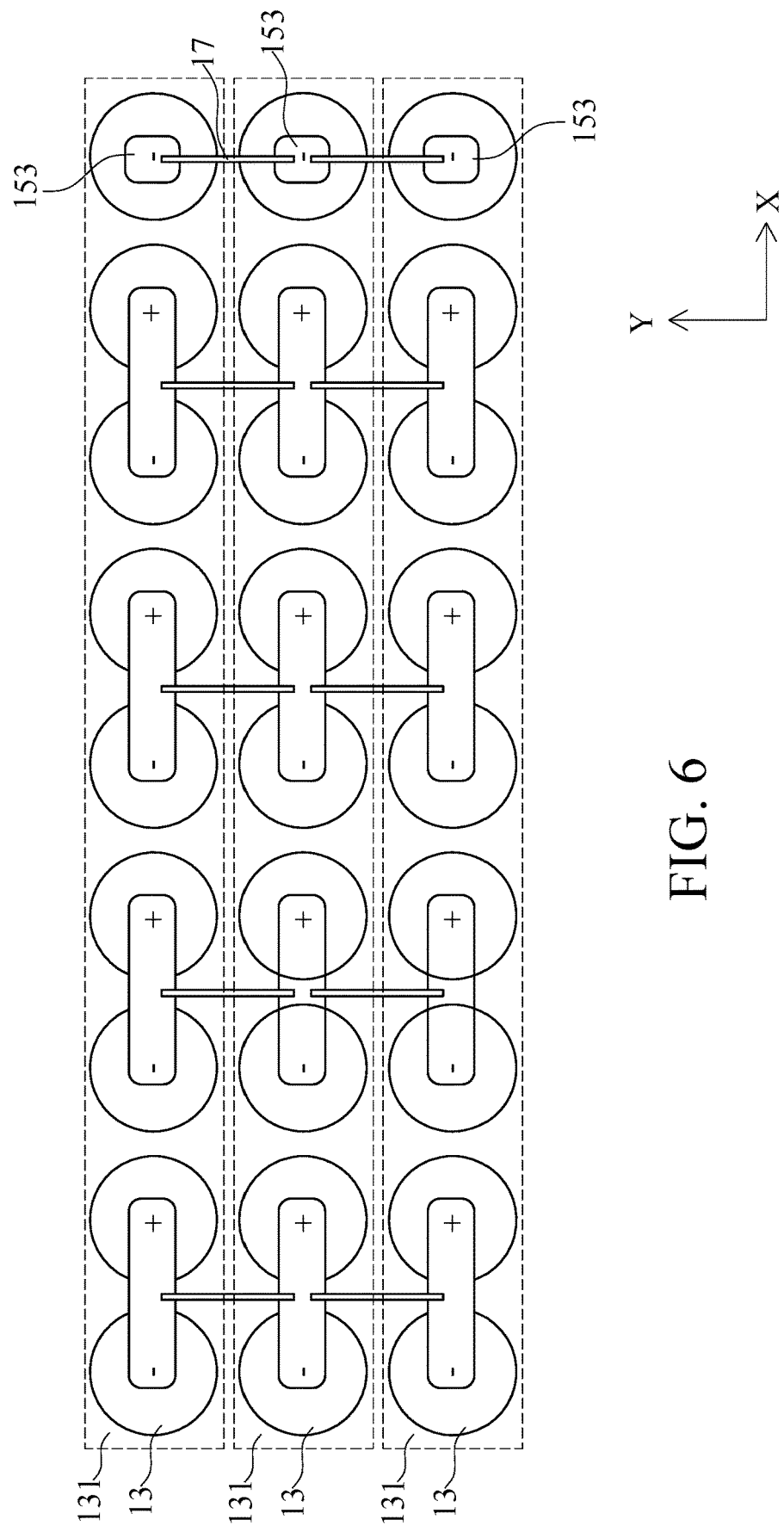

In another embodiment of the invention, the battery module 10 may comprise a plurality of first conductive sheets 151 and second conductive sheets 153 that are respectively connected to a battery cell 13, as shown in FIG. 5 and FIG. 6. In addition, two adjacent first conductive sheets 151 are connected to each other via the protection unit 17, and two adjacent second conductive sheets 153 are connected to each other via the protection unit 17 to protect the battery cells 13 connected with the first conductive sheets 151 and the second conductive sheets 153.

In one embodiment of the invention, a plurality of battery cells 13 may be arranged in a 9×3 matrix. Nine battery cells 13 are arranged in the first direction X, and three battery cells 13 are arranged in the second direction Y, wherein the first direction X is approximately perpendicular to the second direction Y, as shown in FIG. 3 and FIG. 4. In other words, the battery module 10 includes twenty-seven battery cells 13, twenty-four conductive sheets 15, and sixteen protection units 17, wherein nine battery cells 13 in the first direction X are connected in series via eight conductive sheets 17 to form the series battery cell 131. Further, three battery cells 13 in the second direction Y are connected in parallel via two protection units 17. For example, three series battery cells 131 may be stacked, and two adjacent series battery cells 131 are connected in parallel via eight protection units 17, wherein two adjacent conductive sheets 15 in the second direction Y are connected to each other via the protection unit 17, and then two adjacent series battery cells 131 are connected in parallel.

In the above embodiment of the invention, nine battery cells 13 in the first direction X are connected in series to increase the voltage output by the battery module 10, and the three battery cells 13 in the second direction Y are connected in parallel to increase the ampere-hour rating of the battery module 10. Specifically, when the battery cell 13 is a 3.7V lithium battery cell, the battery module 10 can generate a voltage of 33.3V. Of course, the number and arrangement of the battery cells 13, the conductive layers 15, and the protection units 17 are only one embodiment of the invention, may be adjusted according to the needs of the product, and are not the limitation of the invention.

In one embodiment of the invention, the battery module 10 may include a protection board 19 electrically connected to the battery cells 13. The protection board 19 may include a protection circuit board and a PTC (self-resetting fuse) to accurately monitor the voltage and charging/discharging current of the battery cells 13 and control the on/off of the current loop in time, and thus the battery cell 13 can be prevented from being damaged in a high temperature environment.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

The invention claimed is:

1. A battery module for improving safety, comprising:
at least one fixing frame;
a plurality of battery cells arranged on said fixing frame;
a plurality of conductive sheets respectively connected with two of said battery cells in series, wherein each of the plurality of conductive sheets is a thin metal sheet; and
a protection unit connected with two of said conductive sheets, and said battery cells connected to said conductive sheets being connected in parallel via said protection unit, wherein when a temperature of said protection unit is greater than a preset temperature, or a current flowing through said protection unit is greater than a preset current, said protection unit will be blown; wherein the protection unit is a thin metal wire formed between two of said conductive sheets, and a wire width of the protection unit is manufactured according to the preset temperature and the preset current.

2. The battery module for improving safety of claim 1, wherein the protection unit is a thermal fuse, a current fuse, a solder wire, a single-core copper wire, or a self-resetting fuse.

3. The battery module for improving safety of claim 1, wherein said plurality of battery cells are arranged along a first direction and a second direction, said first direction is perpendicular to said second direction, adjacent said battery cells in said first direction are arranged in opposite direction, and said battery cells in said second direction are arranged in the same direction.

4. The battery module for improving safety of claim 1, wherein said conductive sheets are connected with said battery cells in series to form a series battery cell, and said protection unit is connected with said battery cells of two said series battery cells in parallel.

5. The battery module for improving safety of claim 1, wherein a surface of said fixing frame includes a plurality of battery cell grooves for receiving and fixing said battery cells respectively, an other surface of said fixing frame includes a plurality of conductive sheet grooves for receiving said conductive sheets respectively, and each of said battery cell grooves is connected to each of said conductive sheet grooves, respectively.

6. The battery module for improving safety of claim 5, comprising two fixing frames being disposed two ends of said battery cells respectively.

7. The battery module for improving safety of claim 1, further comprising a first conductive sheet and a second conductive sheet both being connected with part of said battery cells in parallel to be a positive terminal and a negative terminal of said battery module respectively.

8. The battery module for improving safety of claim 1, further comprising a plurality of first conductive sheets and a plurality of second conductive sheets being respectively connected with one of said battery cells, wherein two said first conductive sheets are connected each other via said protection unit, and two said second conductive sheets are connected each other via said protection unit.

* * * * *